OR    3,736,040

United States Patent
Zivi et al.

[11] 3,736,040
[45] May 29, 1973

[54] COHERENCE EXTENDER FOR Q-SWITCHED LASERS FOR USE IN HALOGRAPHY

[75] Inventors: Samuel M. Zivi, Sherman Oaks; Gordon H. Humberstone, Encino, both of Calif.

[73] Assignee: TRW Data Systems, Inc., Torrance, Calif.

[22] Filed: Dec. 28, 1970

[21] Appl. No.: 101,898

[52] U.S. Cl..................................350/3.5, 331/94.5
[51] Int. Cl................................................G02b 27/00
[58] Field of Search..................350/3.5; 331/94.5 Q

[56] References Cited

UNITED STATES PATENTS

| | | | |
|---|---|---|---|
| 3,561,839 | 2/1971 | McClung et al. | 350/3.5 |
| 3,582,815 | 6/1971 | Siebert | 331/94.5 |
| 3,436,678 | 4/1969 | Sharp et al. | 331/94.5 |
| 3,358,243 | 12/1967 | Collins et al. | 331/94.5 |

OTHER PUBLICATIONS

McClung et al., "IEEE Jour. of Quantum Electronics," Vol. QE-1, No. 2, May 1965, pp. 94–99.
Brooks et al., QE-2 "IEEE J. of Quant." Elec. 275–279 (8/1966).
"Medical Research Engineering," pp. 5–7 (6/1970).

*Primary Examiner*—Ronald L. Wibert
*Assistant Examiner*—Ronald J. Stern
*Attorney*—Daniel T. Anderson, Edwin A. Oser and Jerry A. Dinardo

[57] ABSTRACT

The coherence of Q-switched, solid state lasers, such as ruby lasers, is improved by employing an intracavity optical element, such as an etalon, positioned between the Q-switch and the active laser medium. This permits the laser to be operated reliably at low pumping power levels and enables holograms and interferograms to be obtained consistently.

4 Claims, 10 Drawing Figures

Samuel M. Zivi
Gordon H. Humberstone
INVENTOR.

BY  *Edwin A. Oser*

ATTORNEY

Samuel M. Zivi
Gordon H. Humberstone
INVENTORS

Motion of a Human Chest During Inhalation, Subject with Left Lung Removed.
The interogram was made by ruby laser holography with the laser being double pulsed approximately midway in the inhalation process (150 microseconds apart).

COHERENCE EXTENDER FOR Q-SWITCHED LASERS FOR USE IN HALOGRAPHY

BACKGROUND OF THE INVENTION

This invention relates to a device for improving the coherence of Q-switched lasers.

The examination of transient phenomena especially those at high speed using holograms and holographic interferograms has applications in vibration analysis, exploding wave fronts, movements of biological particles, etc. In holographic interferometry, a double-exposure hologram is made of the subject by taking two exposures of the phenomena (double pulsing). If the subject moves between the two exposures, the holographic image that is later reconstructed shows the subject in both positions, as in a photographic double exposure. If the subject has moved only slightly between exposures (that is, only a few wavelengths of light), the two images reconstructed by the hologram are essentially superimposed, and appear as one except that interference fringes appear on the image. These fringes are a quantitative measure of the displacement of the subject between the two laser exposures.

However, if the laser output varies in frequency, between pulses, interferograms will be produced having fringes that are a measure of frequency variation rather than due to motion of the scene. While frequency variation may be reduced by operating near the lasing threshold, present-day lasers are unstable there because random changes in laser parameters can cause large fluctuations in laser performance. When such fluctuations occur between one laser shot and the next, it is difficult to obtain consistent holographic results.

Accordingly, an object of this invention is to provide a new and improved Q-switched laser.

Another object is to provide a laser system which produces monochromatic single and double pulses of long temporal coherences and with closely matched wavelengths.

Another object is to provide a laser system which produces good quality holograms and interferograms in a reliable manner.

Other objects of this invention will become apparent from the description and drawings to follow.

SUMMARY OF THE INVENTION

According to the invention, a laser system is provided comprising a primary cavity of an output reflector and a rear reflector, a laser rod positioned between the two reflectors, a Q-switch positioned between the rear reflector and the laser rod, and an etalon positioned between the Q-switch and the laser rod. The etalon functions partly as a mode selector; that is, the etalon favors only certain longitudinal modes or frequencies in the output of the laser. Additionally, it appears the etalon in this particular location functions to reflect back into the laser, photons emitted by the active medium (such as a ruby rod) along the lasing axis during the Q-spoiling period, i.e., when the gain of the cavity is below the lasing threshold. Hence, this intracavity etalon forms a secondary cavity with the output reflector. This secondary cavity has a significant, but less than unity gain during the Q-spoiling period (i.e., when the Q-switch is closed). Consequently, less energy is required to produce lasing during the Q-switching period (i.e., when the Q-switch passes the laser output). Thus, by using the intracavity etalon, it is much easier to consistently operate the laser just above the threshold level. Hence, operating near the threshold will produce maximum coherence, i.e., minimum possibility of more than one longitudinal mode during a single pulse, and minimum possibility of frequency variation between pulses in a pair of rapidly repeated pulses. Optimum conditions are thus attained for holography and interferogram work.

BRIEF DESCRIPTION OF THE DRAWINGS

The invention will become more readily understood by reference to the drawings in which.

DESCRIPTION OF THE PREFERRED EMBODIMENT

Figure 1:
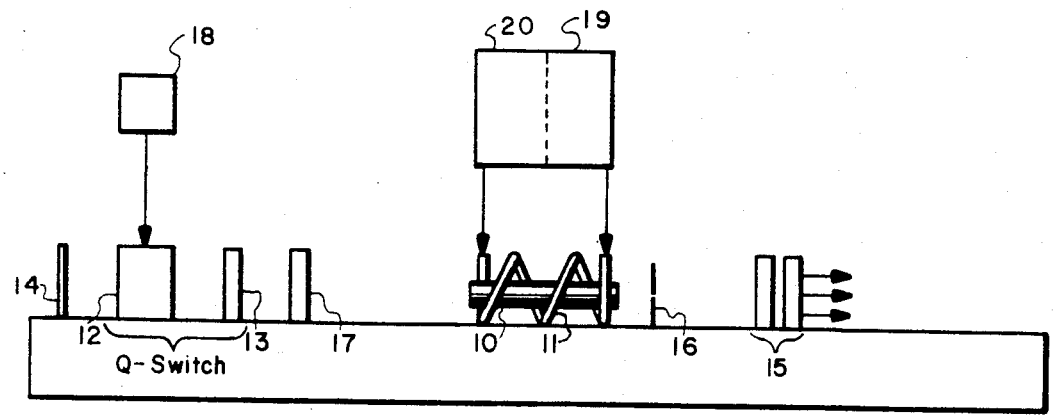
FIG. 1 is a schematic representation of one embodiment of the laser system according to this invention.

The arrangement of the elements in the laser system is shown in schematic form in FIG. 1. This comprises a laser rod 10 with its associated helical flashlamp 11 such as a xenon flashlamp and a Q-switch comprising a Kerr cell 12 and a two-crystal Glan polarizer 13. The reflector system comprises an end reflector 14 with its interior surface coated to provide about 99 percent reflectivity, and an output reflector such as a double sapphire (or quartz) etalon 15 positioned at the output end of the laser system. If desired, an aperture plate 16 may be positioned between the laser rod 10 and double etalon 15, and/or between the laser rod 10 and the intracavity etalon. The inventive feature of the laser system employs an intracavity etalon 17 positioned between the Q-switch and the laser. This position is critical since no improvement, or significantly less improvement in the laser operation will occur if the intracavity etalon is positioned between the laser rod and output etalon 15 or if it is positioned between the Q-switch and end reflector 14. As previously indicated, it is presently believed that the intracavity etalon functions both as a mode selector and also as one reflector of a secondary laser cavity having less than unity gain during the Q-spoiling period. It is believed that the optical field established during Q-spoiling allows lasing to occur after Q-switching with less pumping energy, and with less gain in the active medium. This results in a narrower flourescence band of the active medium (e.g., ruby) and, it is believed, a longer coherence and more monochromatic output.

The Kerr cell 12 is actuated for double pulsing by an electronic circuit 18. If desired, triggering can be initiated (with a time delay) from firing the flashlamp 11, or by a trigger signal provided from an experiment, or from opening and closing an external circuit. Double pulsing with small time intervals between pulses is done by Q-switching twice during a single flashlamp discharge.

The flashlamp may be actuated for single pulsing by firing either of energy banks 19 or 20. If double pulsing with long time intervals between pulses (0.5 milliseconds to several seconds) is carried out, the energy banks 19,20 are discharged sequentially into the flashlamp.

Two different laser rods which were employed had the following characteristics: diameter 0.50 and 0.375 inches; length 3.75 inches; C-axis inclination to rod axis 60°; chromium concentration about 0.03 percent and about 0.05 percent; both ends flat to one-tenth wavelength and parallel to 2 seconds of arc; antireflection coatings on both flat surfaces; right circular, cylindrical surface, fine ground; wave front distortion not exceeding four wavelengths as measured on a Twyman-Green interferometer; output 6,943 A.

Typical distances for the arrangement in FIG. 1 are as follows: overall cavity length, i.e., reflector 14 to double etalon 15–52 inches; reflector 14 to intracavity etalon 17–19 inches; etalon 17 to near end of laser rod-15 inches.

Chilled water was circulated through the laser head to cool the ruby, and dry nitrogen gas was passed around the exterior of the head to prevent moisture condensation on the face of the ruby.

Besides the Kerr cell employed, other Q-switches which are suitable include a Pockels cell, bleachable dyes, a rotating mirror, etc.

The intracavity etalon 17 comprises a resonant reflector. The etalon was ¾ inch in diameter; ⅛ inch thick; crystal orientation 90°; sides flat to one-tenth wavelength and parallel to 2 seconds of an arc; and with zero extraneous bi-refringence. The etalon material was sapphire, although this is not essential, and it could also have been constructed of other optical material with a consequent change in reflectivity.

The etalon reflectivity was about 27 percent, and while not necessarily representing an optimum value, the reflectivity should be high enough to provide suitably high gain during the Q-spoiling mode. However, it was found that interchanging positions of the output etalon 15 (reflectivity 70 percent) with the intracavity etalon 17 practically nullified the effectiveness of the intracavity etalon in providing long coherence. The selection of optimum reflection values can, of course, be determined empirically for each laser system.

The output etalon 15 comprised two air spaced sapphire etalons. The physical dimensions and optical properties of each single etalon were the same as the single intracavity etalon except that the reflectivity of the output etalon as a whole was 70 percent.

As mentioned, an aperture plate 16 may be provided in the cavity; this will reduce off-axis modes and other undesirable radiation.

In operation, employing one of the above described ruby laser rods and the intracavity etalon 17, lasing commenced when the flashlamp voltage was about 3KV (kilovolts) and the flashlamp energy bank capacitance was 360 μF. (micro farads), giving an input energy to the xenon flashlamp of 1,600 Joules.

Without the intracavity etalon, the minimum voltage level necessary to fire the laser increased to approximately 4 KV, corresponding to an input from the energy bank of about 2,880 Joules.

The improvement in coherence due to the intracavity etalon enabled satisfactory results to be obtained consistently, i.e., about 80 percent of the time. Also, double pulsing with between-pulse intervals from 2–500 microseconds could be employed while maintaining the coherence of each of the pulses to about $1 \times 10^{-6}$ of a wavelength.

Figure 2:
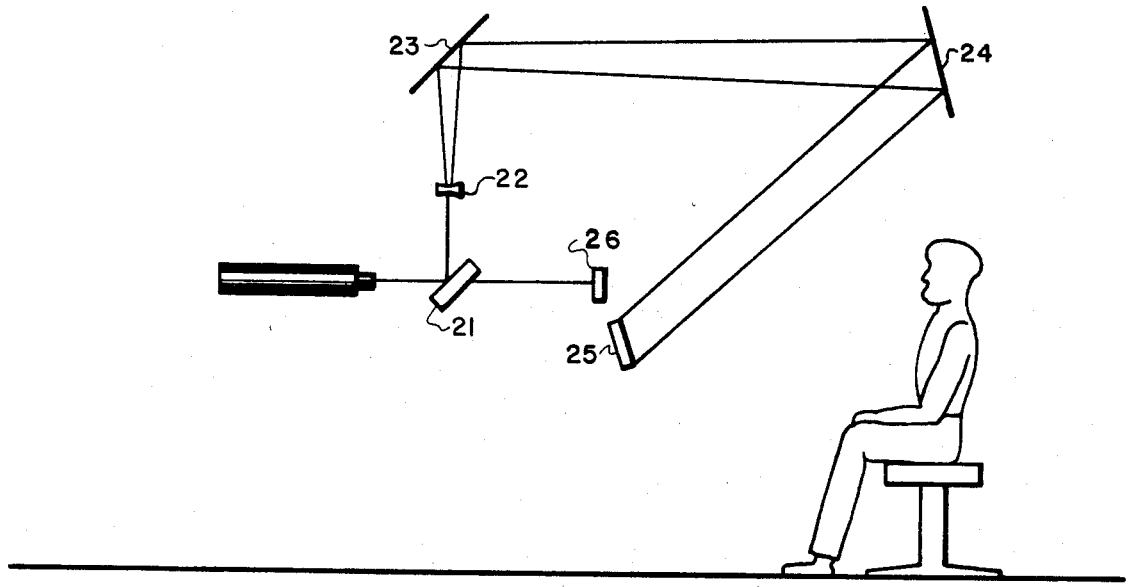
FIG. 2 is a schematic representation of an arrangement for taking holograms and holographic interferograms.

FIG. 2 shows an arrangement which may be employed for producing holograms and holographic interferograms; it is described in Medical Research Engineering, June, 1970, pages 5 through 7. The interferograms of FIGS. 3–5 were reconstructed with a 15 mw helium-neon laser.

In FIG. 2, a source of laser light about 1 cm. in diameter enters the optical and scene recording arrangement from the left. The reference portion of the beam is reflected from a beam splitter 21, passed through a diverging lens 22, and then reflected by mirrors 23 and 24 onto a hologram plate 25 or recording medium. The scene beam is passed through the beam splitter 21, spread through a ground-glass diffuser 26 and impinges on the subject. The scene beam is then reflected from the subject and interacts with the reference beam to form an interference pattern or hologram on the plate 25.

It will be appreciated that when a single laser pulse is employed, an ordinary hologram will be produced, whereas if a double pulse is employed, a holographic interferogram will result if the subject moves during the pulse interval.

The illuminance of the diffuse source was approximately 0.25 J/cm², which is greater than the 0.070 J/cm² value that is considered safe for a Q-switched pulse in a night environment. Therefore, the subject wore goggles having an optical density of 9.0 at the ruby wavelength of 6,943 A.

FIGS. 3 through 7 are photographs of reconstructed holographic interferograms showing opaque subjects using double pulsing in which the pulse intervals were varied from about 20 to 150 microseconds. It will be observed that the interferograms are of good quality.

Figure 3:
FIGS. 3 to 7 are interferograms of opaque subjects made with the laser employing the intracavity etalon of this invention.

In FIG. 3, the laser was double-pulsed approximately midway in the inhalation process. Dark fringes occur wherever the surface moved an odd number of quarter-wavelengths of light (0.6943μ wavelength) between the two laser exposures 150 microseconds apart.

In order to interpret the interferogram completely and quantitatively, some mathematical analysis is required, and often some supplemental information is required to remove ambiguities. In the present example, a qualitative interpretation can be made, as follows. First, the fringes appear to be located on the surface of the subject, or very close to it. This is not apparent from the photograph alone, but can be seen in the hologram itself. This indicates that the surface of the subject is experiencing a deformation that can be characterized largely as local rotations of the various surface elements about the axes near their own planes. If the subject had experienced a simple rigid-body rotation, the fringes would be straight lines parallel to the axis of rotation. Basically, the chest surface was moving outward relative to itself, while experiencing localized variations in motion.

Wherever a dark fringe appears in the image, it means that the surface of the subject moved between laser pulses by an amount such that a light ray reflected from the surface on the second laser pulse was out of phase (i.e., shifted one half-wavelength) with respect to the corresponding ray from the first pulse. This will occur wherever the component of the subject's displacement vector is an odd number of quarter-wavelengths in the direction midway between that of the laser rays incoming to the subject and those reflected by the subject to the hologram. In the present case, this direction was arranged to be approximately normal to the frontal surface of the subject. Then, adjacent dark fringes in the interferogram represent a differential normal displacement of one half-wavelength. The light wavelength was 0.6943 microns (ruby laser), and the time between laser pulses was 150 microseconds. Therefore, where two points on the subject's chest lie on adjacent dark fringes, one point must have been traveling toward the hologram (approximately normal to the chest surface) with a velocity greater than or less than the other by about 0.23 cm/sec. All points on a given fringe are traveling at the same velocity, except for geometrical corrections in regions where the motion is not approximately toward the hologram. Therefore, when a fringe makes a closed loop, as some do in FIG. 3, the enclosed region is either becoming more curved (e.g., a mound or depression, developing) or is flattening (e.g., a mound or depression disappearing). Whether the curvature is increasing or decreasing cannot be deduced from the interferogram, but this can usually be determined from other knowledge of the subject or from other types of measurements. For example, in the interferogram of FIG. 3, the closed circular patterns at each breast are attributed to a localized increase in curvature, as indicated by an independent but qualitative observation of these regions during inhalations.

The motion of the abdominal region appears to be very small at the instant of this double-exposure, since no fringes appear there. Other interferograms taken at different times in the cycle show more activity there. Starting with the lower-most fringe in FIG. 3, and counting to the inner-most quasi-circular fringe at either breast, there are 12 fringes. This indicates a displacement of 12 half-wavelengths in the 150 microsecond interval, or an instantaneous maximum velocity of 2.8 cm/sec. in the breast region, relative to the abdominal region.

Figure 4:
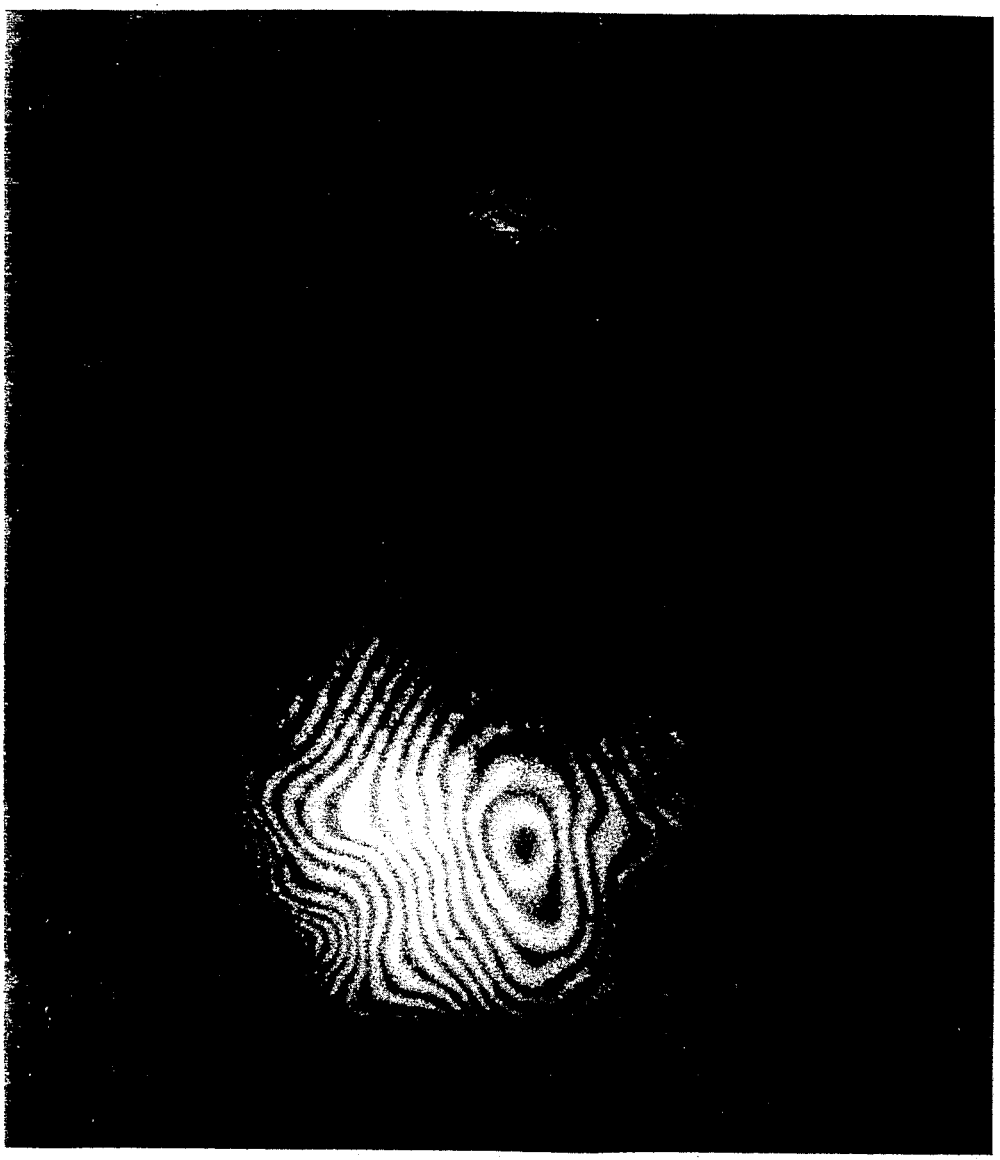

In FIG. 4, the interferogram was produced during double-pulsing of the laser while the subject exhaled rapidly into a tube.

Figure 5:
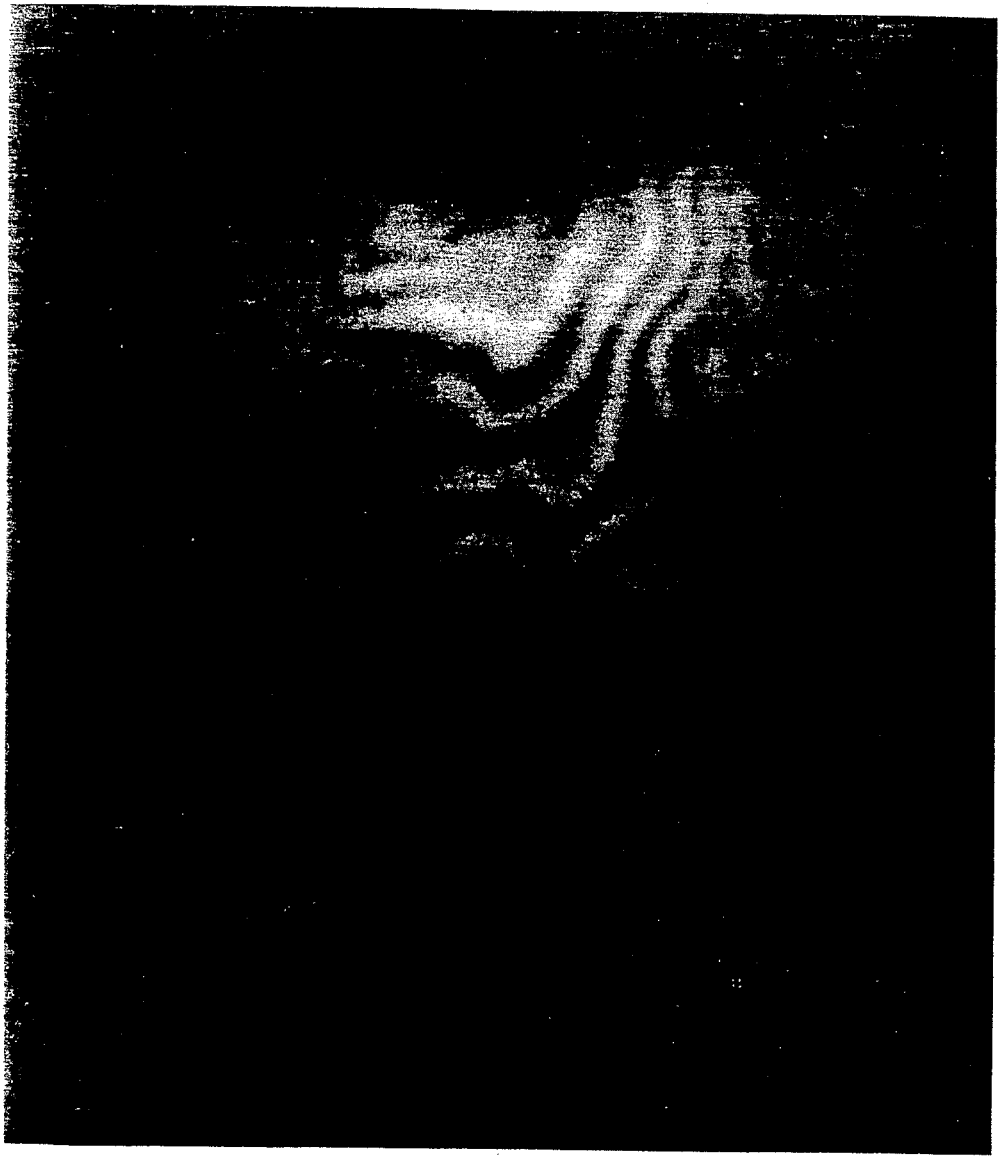

FIG. 5 shows the back of a subject who had had a left pneumonectomy and was taken during inhalation. There is a faint suggestion of the surgical scar as indicated by the arrow, and above the scar bunching of the fringes. It is assumed this is caused by a muscle anomaly as a result of the surgery. This interferogram was made with a 150 microsecond time interval as the subject inhaled.

Figure 6:
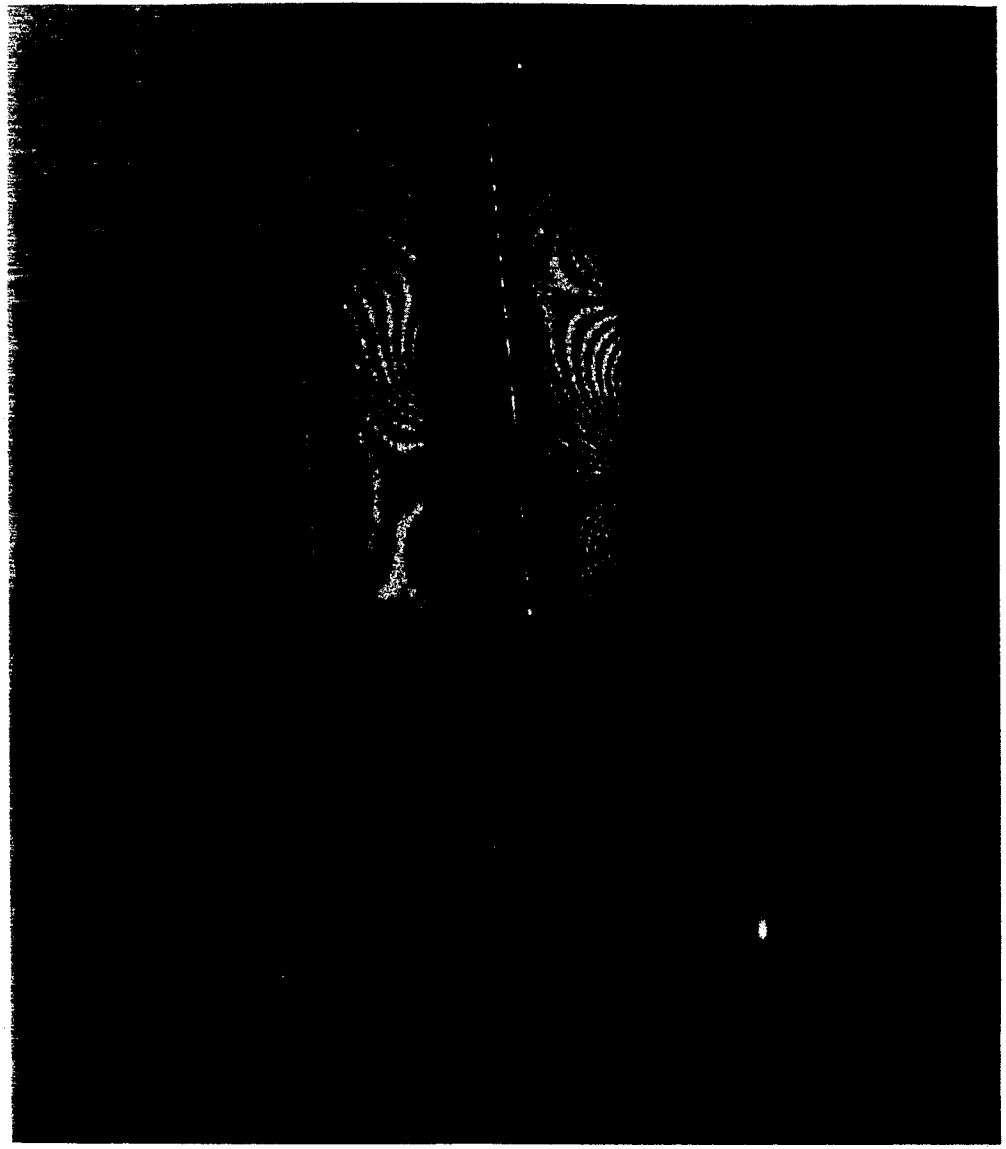

FIG. 6 illustrates an interferogram of two turbine blades rigidly mounted in a machinist's vise showing the vibratory motion induced by a mechanical impulse. In this case the vise in which the blades were mounted was struck with a hammer. The laser pulse was made 1 millisecond after the hammer impact, and the second pulse followed 25 microseconds later.

Figure 7:

FIG. 7 is an interferogram of an aluminum honeycomb panel after impact excitation. The "bullseye" fringe pattern denotes an approximately one-fourth inch unbonded region between the core and the siin of the panel. This interferogram was obtained with a 50 microsecond interval between laser pulses, about 1 millisecond after applying a mechanical impulse.

Figure 8:
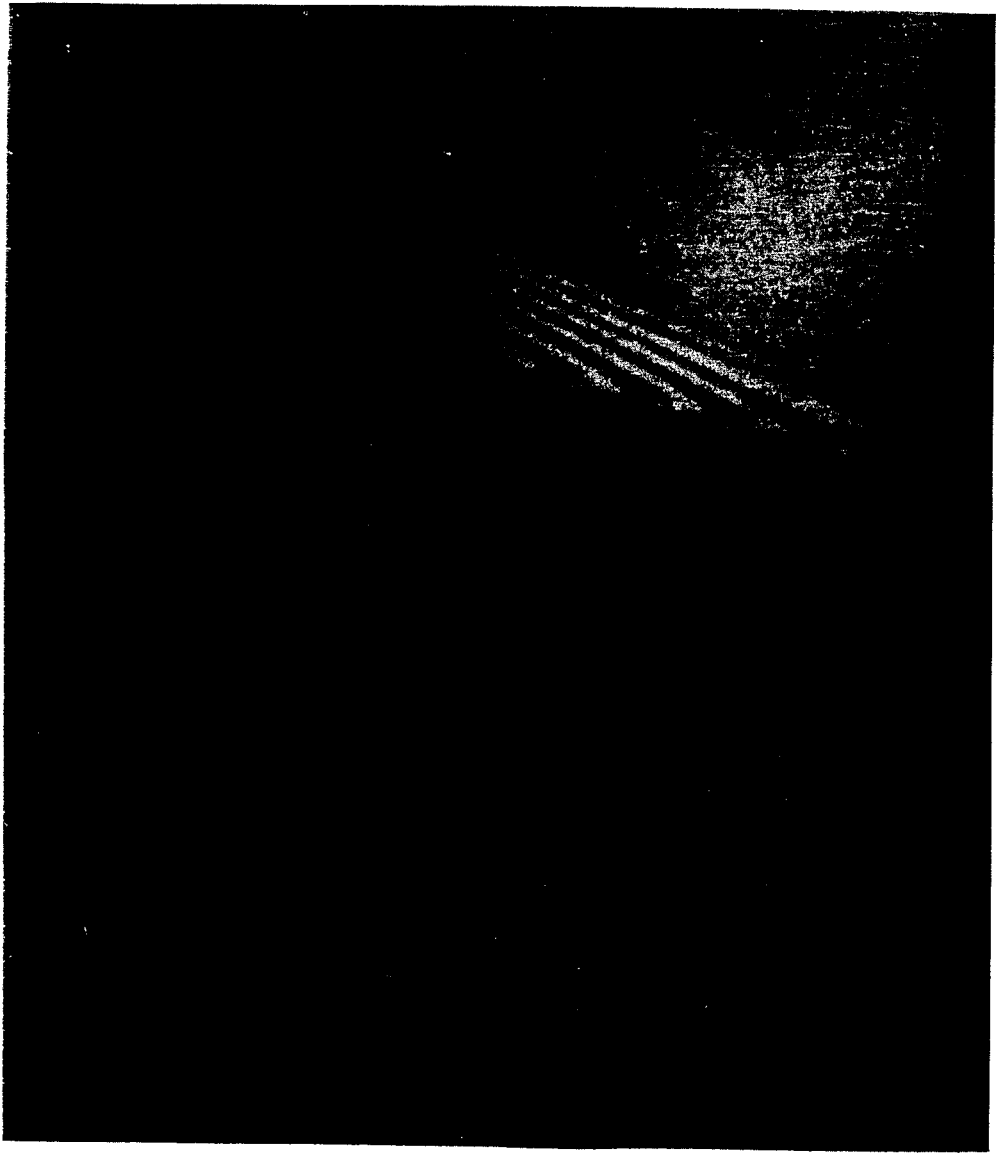
FIGS. 8 and 9 are transmission interferograms made with the laser employing the intracavity etalon.
Figure 9:
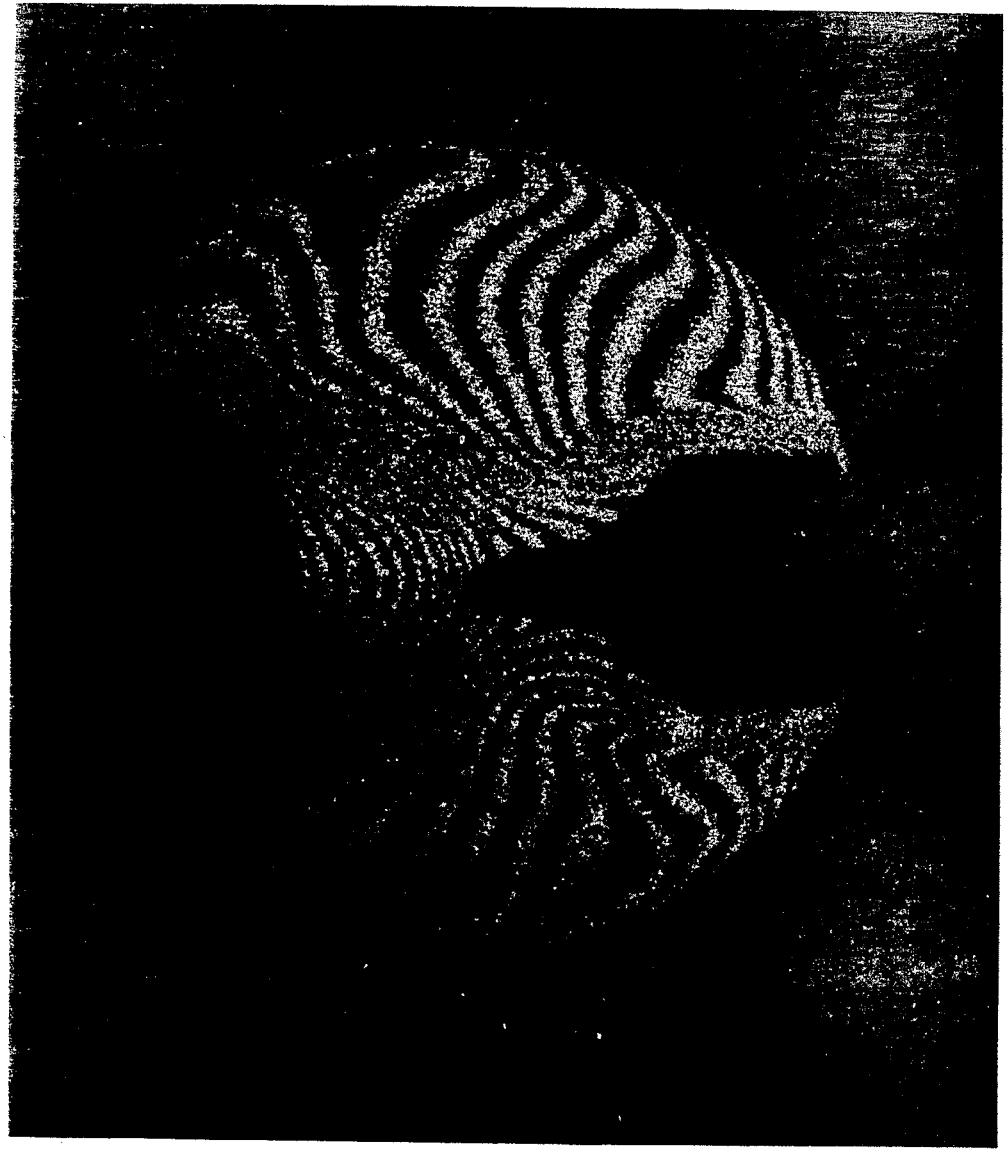
Figure 10:
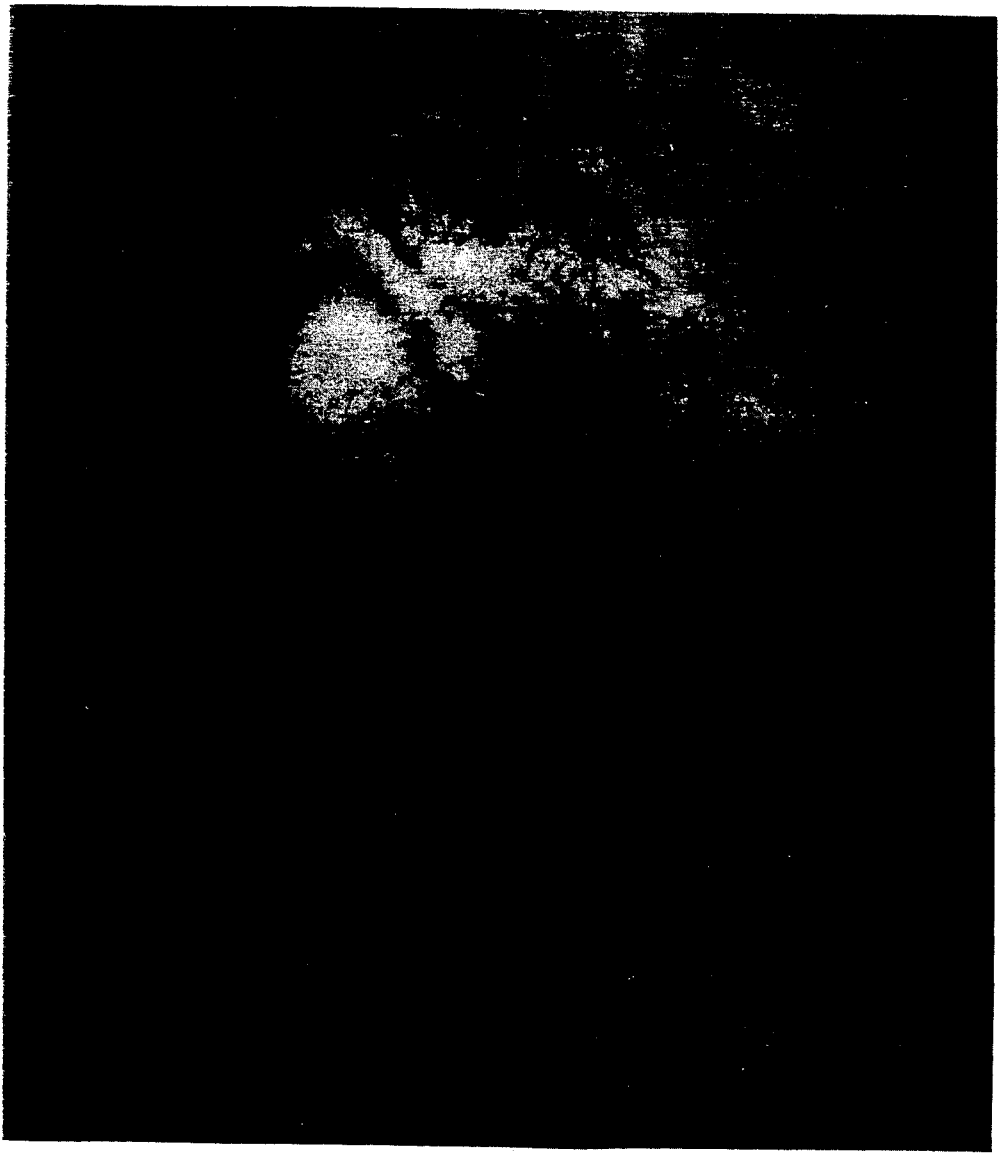
FIG. 10 is an interferogram similar to FIG. 5.

FIGS. 8 and 9 are photographs of reconstructed transmission holographic interferograms in which the double-pulsing was carried out over a significant period of time. It will be observed that these interferograms are also of good quality.

FIG. 8 is an interferogram showing the density distribution in the flow field of a 20 mm projectile, traveling 3,597 ft./sec. The first exposure was made before the weapon was fired, and the second approximately 1 minute later with the ruby laser synchronized to the weapon firing.

FIG. 9 is an interferogram of a high power, experimental arc lamp used in the development of solar lamps. The first exposure was made while the argon-filled lamp was operating at 3 kw and 35 psi. The second exposure was made immediately after the lamp was turned off. The resulting interference fringe pattern shows the change in relative density distribution of the argon gas between the lamp-on and lamp-off condition. A 6,943 A interference filter was used to prevent the high intensity radiation of the lamp from over-exposing the film plate.

Thus, the laser system employing the intracavity etalon of this invention facilitates and promotes the production of good quality holograms and interferograms.

Finally, double pulsing can be employed while still maintaining a high degree of coherence.

It will be appreciated that many parameters are involved in the operation of the present laser system, and these might be varied and still employ the inventive concept of the intracavity etalon or optical element. For example, etalon reflectivity, $Cr_2O_3$ concentration in the ruby crystal, output reflector reflectivity, laser dimensions, etc., all might be varied within the scope of the invention.

What is claimed is:

1. A holographic system comprising:
    a laser system including:
    a primary cavity having a double etalon output reflector and a fixed rear reflector;
    a laser rod positioned between the two reflectors;
    a Q-switch positioned between the rear reflector and the laser rod;
    a partially reflecting solid dielectric etalon oriented parallel to said etalon output reflector and positioned between the Q-switch and the laser rod, said partially reflecting etalon having an overall reflectivity which is substantially less than that of said etalon output reflector, said partially reflecting etalon functioning as a mode selector and forming a secondary cavity with the output reflector;
    beam splitting means adapted to divide the laser output from said laser system into a reference beam and a scene beam; and
    a recording medium for recording the reference and scene beams.

2. The holographic system of claim 1 in which the partially reflecting etalon has a reflectivity of about 27 percent and the double etalon output reflector has a reflectivity of about 70 percent.

3. The holographic system of claim 2 in which the partially reflecting etalon consists of sapphire.

4. The holographic system of claim 1 in which the laser rod comprises ruby.

* * * * *